Patented Aug. 3, 1954

2,685,584

UNITED STATES PATENT OFFICE 2,685,584

PYRIDINE DERIVATIVES AND PREPARATION THEREOF

Thomas Samuel Gardner, Rutherford, and Edward Wenis, Leonia, N. J., assignors to Hoffmann-La Roche Inc., Nutley, N. J., a corporation of New Jersey No Drawing. Application June 3, 1950, Serial No. 166,054

1 Claim. (Cl. 260—294.8)

This invention relates to new chemical compounds and to processes for making said compounds. The novel compounds are useful in the field of therapeutics, and more particularly in the field of tuberculosis. A specific aspect of the invention relates to nicotinaldehyde thiosemicarbazone and acid addition salts thereof.

One method of practicing the processes and making the compounds of the invention involves the steps of reacting β-cyano-pyridine with stannous halide and dry hydrogen halide in an anhydrous organic solvent to form a stannous halide addition complex which on hydrolysis in an aqueous solution comprising thiosemicarbazide yields a stannous halide addition salt of nicotinaldehyde thiosemicarbazone, and decomposing the latter salt with acidulated aqueous hydrogen sulfide to yield a hydrogen halide addition salt of nicotinaldehyde thiosemicarbazone. The free base, nicotinaldehyde thiosemicarbazone, can be prepared by alkalinizing a solution of said hydrogen halide addition salt.

The invention is further disclosed in the following examples, which are illustrative but not limitative of the invention.

Example 1

25 g. of anhydrous stannous chloride were suspended in 200 ml. of anhydrous ether and dry hydrogen chloride gas was passed in until formation of the liquid complex was completed. To the reaction mixture was added 10 g. of β-cyano-pyridine dissolved in 100 ml. of ether. An immediate precipitation of β-cyano-pyridine hydrochloride in a finely divided condition occurred. Stirring was continued while HCl gas was passed in slowly for six hours. After standing overnight, the ether layer was decanted and the residue dissolved in a solution consisting of 100 ml. acetic acid, 150 ml. of water, and 10 g. of thiosemicarbazide. The reaction mixture was heated for three hours on the water bath, during which time a slight precipitation of a yellow solid took place. On cooling, a further quantity was obtained. This product, which was a stannous chloride addition salt of nicotinaldehyde thiosemicarbazone, was filtered off and recrystallized from boiling water containing HCl as a yellow solid. M. P. approximately 214°–215° C. (uncorrected).

Example 2

8.3 g. of the above stannous chloride addition salt of nicotinaldehyde thiosemicarbazone were dissolved in 500 ml. of hot water containing a few drops of hydrochloric acid, and hydrogen sulfide was passed in. A precipitation of stannous sulfide took place. The reaction mixture was filtered, diluted with water, and hydrogen sulfide was again passed in. The procedure was repeated until the reaction mixture was free of tin. The solution was concentrated, a small quantity of concentrated hydrochloric acid was added, and then an excess of ethanol. The desired product, nicotinaldehyde thiosemicarbazone hydrochloride, precipitated as a pale yellow, crystalline solid. M. P. approximately 232°–233° C. (uncorrected).

Example 3

0.25 g. of nicotinaldehyde thiosemicarbazone hydrochloride was dissolved in 20 ml. of water. An excess of concentrated ammonia was added to the aqueous solution, resulting in the formation of a milky suspension. The reaction mixture was heated to 100° C., resulting in a clear solution, which was then filtered. The filtrate was set aside to cool and precipitated a pale cream-colored solid, which was the free base nicotinaldehyde thiosemicarbazone. M. P. approximately 206°–207° C. (uncorrected).

We claim:

A process of making nicotinaldehyde thiosemicarbazone hydrochloride which comprises reacting a stannous chloride addition salt of nicotinaldehyde thiosemicarbazone with hydrogen sulfide until substantially all of the tin has been precipitated and nicotinaldehyde thiosemicarbazone hydrochloride has been liberated.

References Cited in the file of this patent

UNITED STATES PATENTS

| Number | Name | Date |
|---|---|---|
| 2,544,904 | Steiger | Mar. 13, 1951 |